(No Model.)

W. H. STRAYER & W. H. PLANCK.
VEHICLE RUNNER.

No. 292,383. Patented Jan. 22, 1884.

WITNESSES:
Clara Ingenheim
Alice Brennan

INVENTOR:
William Henry Strayer
William Henry Planck
By J. L. Zerk
Attorney.

UNITED STATES PATENT OFFICE.

WILLIAM HENRY STRAYER, OF NORTH MANCHESTER, AND WILLIAM HENRY PLANCK, OF LOGANSPORT, INDIANA.

VEHICLE-RUNNER.

SPECIFICATION forming part of Letters Patent No. 292,883, dated January 22, 1884.

Application filed April 20, 1883. (No model.)

*To all whom it may concern:*

Be it known that we, WILLIAM H. STRAYER, of North Manchester, in the county of Wabash and State of Indiana, and WILLIAM H. PLANCK, of Logansport, in the county of Cass and State of Indiana, have invented a new and useful Improvement in Vehicle-Runners, which improvement is fully set forth in the following specification and accompanying drawings, in which—

Figure 1:
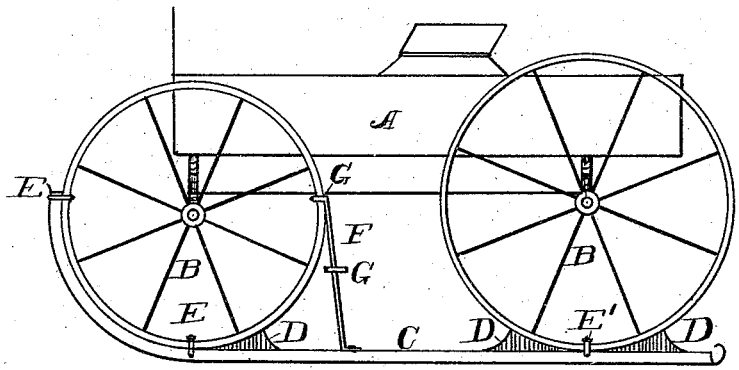
Figure 2:
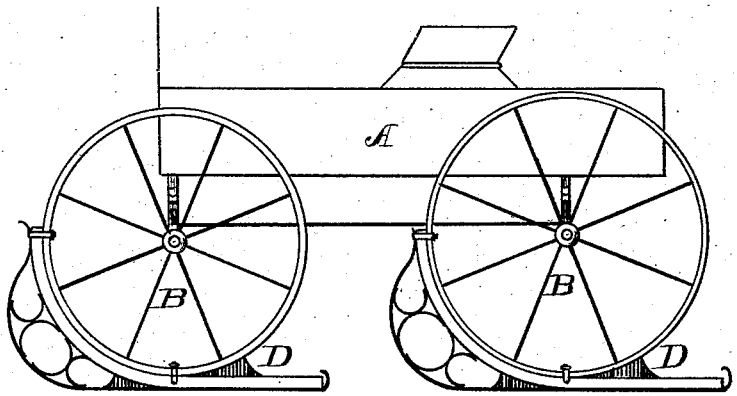

Figure 1 is a side view of our improved vehicle-runner. Fig. 2 is a side view, showing runners adapted for single wheels.

The object of our invention is to provide a method for attaching sleigh-runners to the wheels of carriages, buggies, wagons, or any other vehicle without removing the wheels, thus converting the carriage or other vehicle into a sleigh or sled.

In the drawings, A is the body, and B the wheels, of a carriage or wagon.

Beneath the wheels B are placed the runners C, the horizontal part parallel with the ground, of sufficient length to receive on its upper surface both the wheels on the same side of the vehicle. The forward part of the runners is bent up as far as may be desired to conform to the periphery of the wheel. The runners may be made of wood, in this case the lower surface of the runner to be supplied, as usual, with a metal sole; or, if desired, the runner to be made wholly of metal. Blocks or shoes D are placed beneath the wheels, the upper edges of said blocks to conform to the periphery of the wheels. These shoes are secured to the upper surface of the runner. The forward part of the front wheel rests against the end of the runner, while under the rear part of the wheel the shoe D is placed. Fixed to the runner, and clasping the felly of the wheel, are the clips E, secured by bolts, which enable the wheel to be held firmly in position. For the rear wheel both front and rear shoes may be used, the clip E' serving to hold the wheel firmly thereto.

A vertical brace, F, may be placed in the rear of the forward wheel, the upper end fastened to the felly of the wheel, and the lower end secured to runner. This brace may be provided with one or more steps, G, for convenience in mounting or dismounting from the vehicle.

Fig. 2 shows another form for single runners or bobs. When desired to be used in this manner, two sizes are made, one to fit the front and the other the rear wheel. In this manner the runners work independent of each other.

We are aware it is not new to provide a step or steps on the runners for sleighs, as shown in Patent No. 154,120, and we do not therefore claim this, broadly: but we are not aware that steps have ever before been attached to the braces of the runner, as herein shown.

We are aware it is not new, broadly, to provide vehicles with runners, and we do not therefore claim this; but

What we claim is—

The combination of the runner C, having the curved shoes D, the clips E E', and the brace-rod F, having thereon the step G, with the vehicle-wheels, substantially as herein set forth.

In testimony that we claim the foregoing we have hereunto set our hands, this 16th day of April, 1883, in the presence of witnesses.

WILLIAM HENRY STRAYER.
WILLIAM HENRY PLANCK.

Witnesses:
NATHANIEL GROSSNICKLE,
RUFUS R. GRIMES.